United States Patent Office 3,215,671
Patented Nov. 2, 1965

3,215,671
CROSSLINKED POLYOXYMETHYLENES AND THEIR PREPARATION
Lester Russell Melby, Wilmington, Del., assignor to E. I. du Pont de Nemours and Company, Wilmington, Del., a corporation of Delaware
No Drawing. Filed Mar. 11, 1960, Ser. No. 14,196
25 Claims. (Cl. 260—67)

This application, a continuation-in-part of my co-pending applications Serial Numbers 688,402 and 688,780, filed October 17, 1957, and both now abandoned, relates to crosslinked polyoxymethylenes, to processes for their preparation, and to articles of manufacture made from them.

One of the cheapest and most easily obtained organic compounds is formaldehyde. Formaldehyde monomer is condensed readily to linear polymers (polyoxymethylenes) having thermoplastic properties. These polymers as originally prepared were not used commercially because of their instability and other undesirable properties. Thus even at ordinary temperatures most of the polymers smell badly of formaldehyde. As the temperature rises, moreover, the solid polymers rapidly soften and frequently depolymerize.

More recently a greatly improved polyoxymethylene (MacDoanld U.S. 2,768,994) has been described which overcomes most of the defects noted and which is now being offered to the trade. This polymer is, however, soluble and fusible, and for some purposes a product which is less thermoplastic and more resistant to solvents is desired.

Some other polymers having solubility and fusibility characteristics akin to those of the polyoxymethylenes have been improved by crosslinking the linear polymeric chains, i.e., introducing into the polymer a relatively small proportion of a second compound, or crosslinking agent, which reacts with each of two adjacent chains and joins or bridges the two together.

Crosslinking has not been available heretofore for stabilizing polyoxymethylenes. In one common method of crosslinking, the crosslinking agent and a peroxide catalyst are mixed with the polymer and the mixture is heated to effect a cure. When this method has been attempted with polyoxymethylenes, no curing effect has been observed.

Another known method for obtaining desirable crosslinking in certain polymers involves treatment of the polymers, including certain polyacetals, with diisocyanates. For example, Hanford and Holmes show in U.S. 2,284,896 that polyvinylformal is crosslinked and reduced in water sensitivity by simple treatment with decamethylenediisocyanate. However, these known means for producing crosslinking in certain polymers by dissocyanates do not produce crosslinking in polyoxymethylene. This is confirmed by the fact that a polyoxymethylene modified with n-butylketene dimer and hexamethylenediisocyanate, prepared in a methylene chloride medium according to the teachings of Austin and Frank in U.S. 2,296,249, can be molded at 160° C. into a film seven mils thick which dissolves completely in one hundred times its weight of boiling dimethylformamide within 15 seconds. A polyoxymethylene with any substantial amount of crosslinking would be at least partly insoluble in boiling dimethylformamide.

In another crosslinking process, certain polymers, polyethylene for example, are exposed to ionizing radiation, yielding products of improved thermal resistance. Other polymers, e.g., polymethyl methacrylate, are merely degraded by ionizing radiation and obtain no improvement in physical properties therefrom. Polyoxymethylenes belong to this latter class of compounds and on them ionizing radiation has no known beneficial effects.

An object of the present invention is provision of polyoxymethylenes of decreased solubility and thermoplasticity.

A specific object is the provision of crosslinked polyoxymethylenes.

Another object is provision of methods of improving the resistance of polyoxymethylenes to solvents and to fusion.

A further object is provision of methods of crosslinking polyoxymethylenes.

Another object is the provision of articles of manufacture made from crosslinked polyoxymethylenes.

The major part of the above-mentioned and yet further objects are achieved in accordance with this invention by a process which consists in (a) exposing to ionizing radiation a polyoxymethylene having intimately mixed or dispersed therein from 0.5 to 20% by weight of the polyoxymethylene of selected polyunsaturated compounds, which are described below, or (b) exposing to ultraviolet light a polyoxymethylene having intimately dispersed therein from 0.5 to 20% by weight of selected polyunsaturated compounds, described below, and from 0.01 to 5% by weight of a photo-initiator. The product is a crosslinked polyoxymethylene which is less thermoplastic and has greater solvent resistance than the untreated polyoxymethylene. The preparation of polyoxymethylene articles will be evident from the discussion which follows.

Crosslinked polyoxymethylene by whatever process it may be prepared is characterized by having a plurality of covalently bonded linkages —Q— between catenarian carbon atoms of polyoxymethylene chains, in which Q is a bridging means. The extent of crosslinking (i.e., the plurality of the bridging means Q) is preferably such that at least 30% of the polymer composition remains undissolved when a film thereof of 5–8 mils thickness is immersed in one hundred times its weight of boiling dimethylformamide for two minutes.

Crosslinked polyoxymethylene may alternatively be defined as having at least one covalently bonded linkage —Q—, where Q is a bridging means, between catenarian carbon atoms of different polyoxymethylene chains for each four polyoxymethylene polymer molecules.

The composition of the bridging means —Q— is not critical per se as long as linkage is achieved entirely through covalent bonds. Thus —Q— may be a simple covalent bond, i.e., direct covalent attachment of a catenarian carbon atom in one polyoxymethylene chain with a similar atom in another polyoxymethylene chain. It may also be a single atom or a chain of several atoms covalently bonded to each other and to the carbon atoms in the respective polyoxymethylene chains as shown below.

The polyunsaturated compounds now found most suitable for crosslinking polyoxymethylenes are acid derivatives of the class consisting of esters, amides, and imides containing at least two nonadjacent ethylenic ($>C=C<$) groups, said ethylenic groups being in a terminal position or in conjugation with an oxo oxygen atom in an amide, imide or ester group.

Thus, there may be employed esters, such as allyl acrylate, allyl methacrylate, methylene dimethacrylate, ethylene dimethacrylate, triethylene glycol dimethacrylate, diallyl maleate, diallyl phthalate, ethylene glycol bis-(allyl carbonate), resorcinol dimethacrylate, triallyl cyanurate, and pentaerythrityl tetramethacrylate; amides, such as allyl acrylamide, allyl methacrylamide, and N,N′-methylenediacrylamide; and imides, such as 2,4-tolylenedimaleimide, 1,4-cyclohexylenedimaleimide, and m-phenylenedimaleimide.

The preferred compounds can be represented by the formula $R(XY)_n$, where R is a hydrocarbon or oxygen-interrupted hydrocarbon radical (including aliphatic, cycloaliphatic, arylaliphatic and aromatic radicals with usually not more than 15 carbons), X is

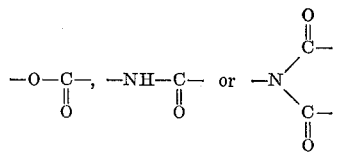

Y is an ethylenically unsaturated hydrocarbon group in which the ethylenic double bond is either terminal or conjugated with a C=O group in X, and $n$ is at least 2. Although not critical, $n$ is preferably not above 6.

In the foregoing processes the use of a polyunsaturated compound is necessary. Closely related monounsaturated compounds, for example, N-phenylmaleimide, do not produce crosslinking in polyoxymethylene on treatment with ionizing radiation or on treatment with ultraviolet light in the presence of a photoinitiator.

Polyoxymethylenes suitable as starting materials in the process of this invention and which are mixed with the polyunsaturated compounds are those having polyoxymethylene chains of at least 100 formaldehyde units in length. All polyoxymethylenes of this length and over may be employed, whether the chains are terminated by hydroxyl groups, ether groups, methyl groups, carboxylate groups or other groups. Thus, there may be employed α-polyoxymethylene, β-polyoxymethylene, and the higher molecular weight polyoxymethylenes, such as eu-polyoxymethylene, as described by J. F. Walker in "Formaldehyde," Second Edition, Reinhold Publishing Corporation, 1953, pages 129–146.

A preferred class of polyoxymethylenes for use in this invention are those polymers having an inherent viscosity of at least 0.8 as measured in a 0.5% solution at 60° C. in p-chlorophenol containing 2% α-pinene.

A particularly preferred class of polyoxymethylenes for use as starting materials are the normally-solid, synthetic, high-molecular weight of polyoxymethylenes selected from the group consisting of (1) polyoxymethylenes having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line (the number of such creasing cycles which the film withstands before breaking at the crease line being the "degree of toughness"), (2) polyoxymethylenes, failing to exhibit a degree of toughness of at least 1, but having a reaction rate constant for thermal degradation at 222° C. of less than 1% by weight per minute, measured by thermally degrading said polyoxymethylene in a vessel open to the atmosphere as shown by R. N. MacDonald in U.S. 2,768,994, and (3) polyoxymethylene dicarboxylates as in British Patent 770,717, having chains at least 100 oxymethylene units in length.

The polyoxymethylenes employed in the specific examples shown below are prepared as follows:

A high molecular weight polyoxymethylene is prepared by polymerizing monomeric formaldehyde in a cyclohexane medium using dimethyldi-(hydrogenated tallow)-ammonium acetate initiator. The term "hydrogenated tallow" represents a mixture of 70% octadecyl groups and 30% hexadecyl groups. This polymer is converted to the corresponding polyoxymethylene diacetate by vapor phase reaction with acetic anhydride at 125–150° C. in the presence of a tertiary amine catalyst until substantially all the hydroxyl groups on the original polymer are replaced with acetate groups. The resulting polyoxymethylene diacetate is referred to herein as polyoxymethylene A.

Polyoxymethylene A is stabilized by incorporating uniformly therein 1% by weight of a polyamide terpolymer containing approximately 38% polycaprolactam/35% polyhexamethyleneadipamide/27% polyhexamethylenesebacamide, and 0.2% by weight of 1,1-bis(3-tert-butyl-4-hydroxy-6-methylphenyl)-butane. The resulting stabilized product is referred to herein as polyoxymethylene B and has a reaction rate constant for thermal degradation at 222° C. of less than 0.1% by weight per minute.

It is to be understood that the polyoxymethylene compositions employed in this invention may contain additives such as pigments, plasticizers, lubricants, stabilizers and the like.

Suitable ionizing radiations for use in this process include both radiation in the form sometimes regarded as particle radiation and radiation in the form sometimes regarded as ionizing electromagnetic radiation.

By particle radiation is meant a stream of particles such as electrons, protons, neutrons, alpha-particles, deuterons, beta-particles, or the like, so directed that the said particle impinges upon the polyoxymethylene composition. The charged particles may be accelerated by means of a suitable voltage gradient, using such devices as a cathode-ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deutrons or alpha-particles. In addition, particle radiation suitable for carrying out the process of this invention may be obtained from an atomic pile, or from radioactive isotopes or from other natural or artificial radioactive materials.

By ionizing electromagnetic radiation is meant radiation in the form of photons of the type produced when a metal target (e.g., gold or tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, it is acceptable to refer to energy equivalents between for example, radiation commonly considered as particle radiation and radiation commonly considered as wave or electromagnetic radiation. In the process of this invention ionizing radiation in the form of particles or photons having an energy equivalent of a beam of electrons each having an energy of at least 0.0001 mev. (million electron volts) may be employed. Radiation with energy equivalent to a beam of electrons of 0.0001 to 0.1 mev. energy is preferred where radiation of this energy is available at low cost and time is not a primary factor in the economic aspect of the process. Radiation with energy equivalent to a beam of electrons of 0.1 mev. and over (i.e., 0.1 mev. up to 2 to 5 mev.) is preferred where the cost of the higher intensity radiation may be offset by the saving in exposure time. This is particularly true in continuous operation. Radiation with higher energies (i.e., 10 mev. and higher) may also be employed.

The dosage, or quantity, of radiation absorbed by the polyoxymethylene/polyunsaturate composition in the process of this invention should be at least 0.25 watt-seconds/gram (25,000 rads) to produce useful amounts of crosslinking. One rad is the quantity of radiation which will result in an energy absorption of 100 ergs per gram of irradiated material. It is desirable to avoid excessive amounts of irradiation. The tendency of unmodified polyoxymethylene to degrade under ionizing radiation has been noted above. Degradation represents a process which appears to compete with the crosslinking process of this invention, and excessive irradiation produces undue embrittlement even in compositions containing polyunsaturated crosslinking agents. However, as illustrated in Example 5, below, when the amount of the particular crosslinking agent and the amount of irradiation are suitably selected, the products are not only insolubilized and decreased in thermoplasticity, but also have higher tensile strength and greater stiffness than the controls. The particular amounts of crosslinking agent and radiation which produce these optimum results vary with the particular polyunsaturated compound and the type of radiation employed. The more highly crosslinked products of this invention are more brittle than unirradiated controls, but such products are useful in applications where solvent resistance and decreased thermoplasticity are of prime consideration.

In the process for crosslinking polyoxymethylene that involves the use of ultraviolet light a photoinitiator must be used in addition to the polysaturated compound. The polyunsaturates used in this process are those referred to above.

Photoinitiators are the initiators for addition polymerization which are activated by ultraviolet light. Suitable photoinitiators include vicinal dicarbonyl compounds, such as diacetyl, benzil, 2,3-pentanedione, 2,3-octanedione, 1-phenyl-1,2-butanedione, 2,2-dimethyl-4-phenyl-3,4-butanedione, phenylglyoxal, diphenyl triketone, etc.; aromatic diketones such as anthraquinone; α-hydroxy ketones (acyloins) such as benzoin and pivaloin; acyloin ethers, such as benzoin methyl ether, benzoin ethyl ether; α-hydrocarbon-substituted aromatic acyloins, including α-methylbenzoin, α-allylbenzoin and α-phenylbenzoin.

By ultraviolet light is meant light of wave lengths within the range of 500 to 4000 A. Particularly effective in carrying out the instant process is ultraviolet light with wave lengths within the range of 2000 to 3800 A.

The fate of the photoinitiator employed in the process is uncertain. In any event, residues thereof have not been detected as such in the polymer obtained. Consequently, the products of the instant processes are indistinguishable from each other when crosslinked to the same extent when the same polymer and polyunsaturates are used.

The time for which the polyoxymethylene is exposed to high energy radiation or to ultraviolet light will depend on the degree of crosslinking desired and to some extent on the nature of the radiation. In general the crosslinking reaction occurs faster with high energy radiation than with ultraviolet light. In most cases the desired degree of crosslinking can be obtained in relatively short times. Irradiation procedures which are completed within an hour or less are preferred to those taking more than one hour. Much longer periods may, however, be employed depending upon the degree of crosslinking desired and the form in which the polymer is irradiated. Wide variations in temperature and pressure both above and below ambient conditions have little effect on the process and ambient temperature and pressure are therefore preferred. The process may be carried out in the presence of air, in the absence of air, or in an inert atmosphere such as nitrogen, helium or the like.

The products of this invention are regarded as crosslinked compounds of the type discussed by Flory, "Principles of Polymer Chemistry," Cornell University Press, pages 356–361 (1953). The chemical structure of the suitable crosslinking agents, i.e., the minimum requirement therefor of at least two nonadjacent ethylenic groups, and the physical nature of the product, i.e., the observed decrease in polymer solubility and increase in polymer softening temperature, both extremely marked in some instances, are proofs of the ultimate crosslinked structure of these products.

Crosslinked polymers are, of course, structurally different from ordinary linear copolymers. In linear copolymers the various monomer units appear in the same polymer chain. Crosslinked polymers also differ from mixtures of polymers since such mixtures can generally be readily separated by appropriate means as by extraction. Crosslinked polymers differ, too, from branched polymers in which a distinct monomer is attached to only one polymer chain. They are, furthermore, distinguished from the recently-developed type of polymers known as graft polymers in which layers of one polymer are condensed onto the surface of a bulk of a second substrate polymer.

Crosslinked polyoxymethylene is characterized by structures with crosslinking bridges between polyoxymethylene chains. Such a bridge is linked through covalent bonds and is structurally illustrated as follows:

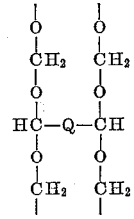

where Q is a bridging means as defined above.

The crosslinked polyoxymethylenes obtained by processes described above are characterized by structures in which the crosslinking bridges between polyoxymethylene chains are derived from the above-defined polyunsaturated compounds. Such a bridge is linked through covalent bonds and is structurally illustrated as follows:

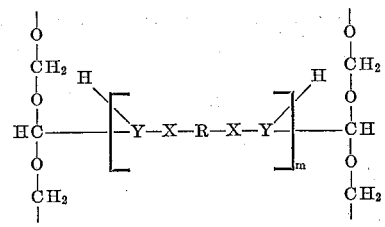

where $m$ is a positive integer from 1 to 10 and R, X and Y are as defined previously. In this form, the bridging means —Q— is empirically the dihydride of a chain of one or more $R(XY)_n$ units. Thus, when N,N'-methylenediacrylamide is the crosslinking agent and $m=1$, —Q— becomes

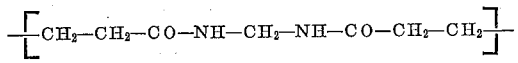

and when m-phenylenedimaleimide is the crosslinking agent and $m=1$, —Q— becomes

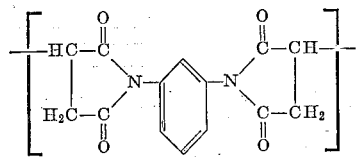

With these compounds and the related esters, it can readily be seen that, when $m$ is 10, —Q— may be composed of up to 300 carbon, hydrogen, oxygen, and nitrogen atoms, up to ninety of which are in the form of a covalently bonded chain of carbon, oxygen and nitrogen atoms.

The present crosslinked polyoxymethylenes contain at least one bridge (—Q—) for every 10,000 oxymethylene units in the polymer. In a polyoxymethylene of 100,000 molecular weight, there is thus at least one bridge for every four polymer molecules. Crosslinking to the extent of at least one crosslink for every four polymer molecules is the minimum requirement to produce an observable decrease in polymer solubility and increase in polymer softening temperature (Flory, op. cit., page 359). The products in the examples contain more than one such bridge per four polymer molecules.

As shown in the examples, the amount of crosslinking may be varied, thereby providing a choice of the degree of removal of the thermoplastic properties of the polyoxymethylene and the degree of removal of the capacity of the polyoxymethylene to be dissolved in boiling dimethylformamide. These variations are obtained in the processes of this invention by control of the amount of polyunsaturated crosslinking agent incorporated and/or the dosage of radiation employed, preferred amounts and dosages falling within the ranges given.

In general polyoxymethylenes which have been crosslinked to a moderate degree will have zero strength temperatures in the range of about 10° C. to 50° C. in excess of the zero strength temperature of the corresponding non-crosslinked polymer. This means that, in the case of polyoxymethylene A and B employed in a number of the examples, the crosslinked polymer will have a zero strength temperature in the range of 160–200° C. In general these moderately crosslinked polymers will remain undissolved to the extent of at least 30% of their original weight after immersion as films from 5 to 8 mils in thickness in at least 100 times their weight of boiling dimethylformamide (ca. 153° C.) for two minutes. These crosslinked polymers retain some thermoplasticity and are preferred where partly crosslinked polyoxymethylenes are desired which may be molded or extruded under heat and pressure to yield useful homogeneous forms, such as molded objects, tubing wire covering, beading, films, monofilaments and the like. All such objects are characterized by form stability at temperatures above those characteristic of the corresponding uncrosslinked polyoxymethylene.

The more highly croslinked polyoxymethylenes of this invention have zero strength temperatures more than 50° C. above the zero strength temperature of the corresponding noncrosslinked polymer. In general these crosslinked polymers will remain undissolved to an extent of at least 45% of their original weight after immersion as films from 5 to 8 mils in thickness in at least 100 times their weight of boiling dimethylformamide for two minutes. These more highly crosslinked polyoxymethylenes are not sufficiently thermoplastic at temperatures below their degradation temperature to permit ready formation into homogeneous, molded and extruded shapes by means of heat and pressure. These crosslinked polyoxymethylenes are accordingly most useful in the physical shape they possess at the time of irradiation. However, such shapes may be readily altered to some extent by orientation, as in deep-drawing of sheets and moldings, two-directional orientation of films and drawing of fibers to increase their strength.

The advantages of the crosslinked polyoxymethylenes of this invention over corresponding uncrosslinked polyoxymethylenes are illustrated by their characteristics in fiber form. Uncrosslinked polyoxymethylene, such as polyoxymethylene B (above), may be melt-extruded into filaments. The filaments may be drawn and converted to thread which is woven or knitted into a fabric. Such a fabric has excellent utility at ordinary temperatures but is not rated as "ironable" because of the thermoplasticity of the polymers. When, however, a composition of polyoxymethylene B containing 5% N,N'-methylenediacrylamide is extruded into filaments which are subsequently exposed to 11.0 watt-seconds/cm.$^2$ of ionizing radiation according to this invention, either before or after drawing and conversion of the fibers to a fabric, the resulting fabric of crosslinked polyoxymethylene does not melt when ironed, for example, at a temperature of 200° C. and thereby has greatly increased utility for thermal insulation.

There follow some nonlimiting examples which illustrate embodiments of the invention in more detail. Examples 1–19 illustrate application of high energy radiation in crosslinking and Examples 20–24 the application of ultraviolet light.

*Example 1*

Fluff samples of polyoxymethylene B are intimately mixed in a ball mill with 2%, 5%, and 10%, respectively, by weight of N,N'-methylenediacrylamide. Portions of each mixture are converted to films five mils thicks by pressing between platens at 190° C. and 4000 lb./sq. in. pressure and then cooling. The films are irradiated with electrons using the exposures indicated in Table I, the electrons being produced by a Van de Graaff accelerator operating at 2 mev. (million electron volts) and 250 microamperes. Exposures are expressed in passes under the electron beam, one pass being equivalent to 11.0 watt-seconds/cm.$^2$. The irradiated samples and corresponding unirradiated controls are tested for zero strength temperature and solubility by the following procedures, and the results are shown in Table I.

Zero strength temperature is determined on a strip of 5 to 8 mil film ⅛" wide and about 2" long. One end of the strip is attached to a stationary clip. The strip is then draped over a brass bar ⅜" in diameter and equipped with an electric heating element. An one-gram weight is attached to the free end of the strip. The temperature of the bar is raised from room temperature to 240° C. in a period of about five minutes. The temperature at which the free end of the strip breaks and falls away is recorded as the zero strength temperature.

Solubility in dimethylformamide is determined by boiling a sample of the irradiated 5 to 8 mil film in a large excess of dimethylformamide (at least 100 times the weight of the film) and observing whether the film is completely dissolved, partly dissolved, or insoluble in the time indicated.

TABLE I

| Percent N,N'-methylenediacrylamide | Zero Strength Temperature, ° C. | | | | Solubility in Boiling DMF (2 Minutes) | | | |
|---|---|---|---|---|---|---|---|---|
| | 0 Passes (control) | 1 Pass | 2 Passes | 5 Passes | 0 Passes (control) | 1 Pass | 2 Passes | 5 Passes |
| 2 | 148 | 158 | 150 | 146 | Soluble | Partly soluble. | Partly soluble. | Partly soluble. |
| 5 | 148 | 220 | 216 | (>220) | ____do____ | Insoluble | Insoluble | Insoluble. |
| 10 | 146 | >220 | >220 | (>220) | ____do____ | ____do____ | ____do____ | Do. |

*Example 2*

A portion of the 5-mil film of polyoxymethylene B containing 10% of N,N'-methylenediacrylamide, prepared as shown in Example 1, is cut into strips 3 mm. wide. These strips are oriented by drawing to four times their original length over a metal bar heated at 145–150° C. Some of the oriented strips are irradiated with 2-mev. electrons in the manner of Example 1. An oriented strip irradiated for one pass has a zero strength temperature of 210° C. and is substantially insoluble after 2 minutes in boiling dimethyl formamide. Unirradiated control strips have zero strength temperatures of 150±2°C. and dissolve in boiling dimethylformamide within a few seconds. Similarly oriented strips of polyoxymethylene B films containing no difunctional unsaturated crosslinking agent, both unirradiated and irradiated one pass, have zero strength temperatures of 160±3° C. and dissolve in boiling dimethylformamide within a few seconds.

rent, the films are given exposures to a 2-mev. electron beam as indicated in Table III. Subsequent zero strength temperatures and solubility determinations are shown.

TABLE III

| Polyoxy-methylene | Additive, Percent | | Zero Strength Temp., ° | | Solubility in Boiling Dimethylformamide (2 minutes) | |
|---|---|---|---|---|---|---|
| | N,N'-methyl-enediacrylamide | m-Phenylene-dimaleimide | 3 watt-sec./cm.$^2$ | 6 watt-sec./cm.$^2$ | 3 watt-sec./cm.$^2$ | 6 watt-sec./cm.$^2$ |
| A | | 5 | 191 | 182 | Insoluble | Insoluble. |
| B | | 5 | 155 | [1] 184 | Soluble | Do. |
| A | 2 | | 177 | 160 | Insoluble | Do. |
| A | 4 | | 196 | 191 | Do | Do. |
| A | 6 | | 202 | 207 | do | Do. |
| A | 8 | | 209 | 208 | do | Do. |
| A | 10 | | 199 | 213 | do | Do. |
| B | 4 | | 207 | 215 | do | Do. |
| B | 6 | | 204 | 215 | do | Do. |
| B | 8 | | 215 | 218 | do | Do. |
| B | 10 | | 213 | 222 | do | Do. |

[1] This composition has a tensile strength of 8,830 lb./in.$^2$ at 9.7% elongation with a modulus of 231,000 lb./in.$^2$ as compared to an unirradiated control portion of the same film which has a tensile strength of 8,150 lb./in.$^2$ at 11.8% elongation with a modulus of 209,000 lb./in.$^2$

*Example 3*

Polyoxymethylene A is milled in a ball mill with 1, 2, 3, 4, 6, 8 and 10%, respectively, of N,N'-methylenediacrylamide. As soon as each composition becomes uniform, the mixture is removed from the mill. Samples of the respective compositions are pressed at 190° C. and 4000 lb./sq. in. pressure to give 5-mil films. These films are irradiated with 2-mev. electrons in the manner of Example 1. The zero strength temperatures of the products are shown in Table II. Solubilities in boiling dimethylformamide decrease progressively with increasing concentration of N,N'-methylenediacrylamide. Unirradiated control films exhibit zero strength temperatures of 150±2° C.

TABLE II

| Percent N,N'-methylenediacrylamide | Zero Strength Temperatures, ° C. | |
|---|---|---|
| | 1 Pass | 2 Passes |
| 0 | 150 | 146 |
| 1 | 152 | 150 |
| 2 | 166 | 154 |
| 3 | | 157 |
| 4 | 209 | 189 |
| 6 | 207 | 216 |
| 8 | 216 | 223 |
| 10 | 227 | 231 |

*Example 4*

Polyoxymethylene B is intimately blended with 5% by weight of m-phenylenedimaleimide. Films of this composition 5 mils thick are prepared by pressing at 190° C. and 4000 lb./sq. in. pressure. Samples of these films are given one and two passes, respectively, under an electron beam operating at 2 mev. and 250 microamperes, as described in Example 1. A nonirradiated control film has a zero strength temperature of 146° C. and dissolves in boiling dimethylformamide within a few seconds, whereas the one and two pass irradiated samples have zero strength temperatures of 172° C. and 200° C., respectively, and both are substantially insoluble after 2 minutes in boiling dimethylformamide. When polyoxymethylene A is used in place of polyoxymethylene B in the process of this example, the one pass irradiated film (containing 5% m-phenylenedimaleimide) has a zero strength temperature of 194° C.

*Example 5*

This example shows the effect of lower dosages of radiation in preparing crosslinked polyoxymethylene. Compositions of polyoxymethylenes A and B containing N,N'-methylenediacrylamide or m-phenylenedimaleimide as indicated in Table III are prepared and molded into films in the manner of Example 1. By varying the cur-

*Example 6*

This example shows the preparation of crosslinked polyoxymethylene by the action of X-rays. Two samples of polyoxymethylene B containing 6% of N,N'-methylenediacrylamide and 5% of m-phenylenedimaleimide, respectively, are molded into 5-mil films in the manner of Example 1. Portions of these films are exposed for one hour to X-rays formed in a Van de Graaff accelerator by bombardment of a gold target with 2-mev. electrons at a current of 250 microamperes, the films being 10 cm. distant from the target. Under these conditions the exposure is 5.5 watt-seconds/cm.$^2$, equivalent to about ½ of a pass under 2-mev. electrons at a current of 250 microamperes as shown in Example 1. Zero strength temperature and solubility tests are applied to the irradiated samples along with a corresponding irradiated control containing no crosslinking agent. The results are given in Table IV.

TABLE IV

| Additive | Zero Strength Temperature ° C. | Solubility in Boiling Dimethylformamide (2 minutes) |
|---|---|---|
| None | 150 | Soluble. |
| 6% N,N'-methylenediacrylamide | 213 | Insoluble. |
| 5% m-Phenylene-dimaleimide | 184 | Do. |

*Example 7*

Two samples of polyoxymethylene B fluff are slurried with ether solutions of triethylene glycol dimethacrylate, and the ether is then evaporated to yield compositions containing 5% and 10% by weight, respectively, of the dimethacrylate. Films 5 mils thick are molded from these compositions in the manner of Example 1, along with a control film of unmodified polyoxymethylene B. Portions of the films are irradiated with 2-mev. electrons for one pass in the manner of Example 1 (11.10 watt-seconds/cm.$^2$). Half-inch squares of both unirradiated portions and irradiated portions of the three films are tested for crosslinking by dropping them into boiling dimethylformamide. All three unirradiated samples and the control unmodified irradiated sample dissolve completely within ten seconds. The irradiated sample containing 5% triethylene glycol dimethacrylate is not dissolved after sixty seconds of boiling and the irradiated sample containing 10% triethylene glycol dimethacrylate is not dissolved after 120 seconds of boiling.

*Example 8*

A composition of polyoxymethylene B containing 5% diallyl maleate is prepared in the manner of Example 7. Portions of a 5-mil film of this composition, molded as in Example 1, are submerged 2 mm. below the surface of water and irradiated with electrons for three and four passes, respectively, as described in Example 1. The sample irradiated for three passes does not dissolve after thirty seconds in boiling dimethylformamide, and the sample irradiated four passes does not dissolve after 120 seconds in boiling dimethylformamide, whereas, an unirradiated portion of the film dissolves completely within ten seconds.

*Example 9*

Polyoxymethylene B fluff is mixed with 6% by weight of 2,4-tolylenedimaleimide in a ball mill. A 5-mil film of the resulting composition is molded at 190° C. and 4000 lb./sq. in. pressure as in Example 1 and cut into strips ⅛″ x 2″. One strip irradiated with 2 mev. electrons for one pass as in Example 1 has a zero strength temperature of 239° C. and is substantially insoluble after 2 minutes in boiling dimethylformamide. Another strip irradiated for five passes has a zero strength temperature of 270° C. and is insoluble after 2 minutes in boiling dimethylformamide. An unirradiated strip of the same film has a zero strength temperature of 152° C. and dissolves quickly and completely in dimethylformamide.

*Example 10*

Polyoxymethylene B fluff is mixed with 6% by weight of triallyl cyanurate in a ball mill. A 5-mil film is molded and cut as in Example 9. One strip irradiated with 2 mev. electrons for two passes in the manner of Example 1 has a zero strength temperature of 175° C. and is only partly dissolved after 2 minutes in boiling dimethylformamide. Another strip irradiated five passes has a zero strength temperature of 240° C. and has greatly reduced solubility in dimethylformamide. An unirradiated strip of this film has a zero strength temperature of 161° C. and is rapidly and completely dissolved by boiling dimethylformamide.

*Example 11*

Twelve parts of polyoxymethylene, having an inherent viscosity of 1.36, measured in p-chlorophenol containing 2% α-pinene, and a reaction rate constant $k_{222}$ of 0.77% by weight per minute and prepared as described in Example 10 of MacDonald U.S. 2,768,944, is mixed with 1 part of 2,4-tolylenedimaleimide in a ball mill at room temperature until a uniform composition is obtained. A 5-mil film of this composition is molded at 190° C. and 4000 lb./sq. in. pressure as in Example 1 and divided into two parts. One part is irradiated with 2 mev. electrons for two passes as in Example 1. Strips ⅛″ x 2″ cut from this part have zero strength temperatures of 187±1° C. and are not dissolved after sixty seconds in boiling dimethylformamide. Similar strips cut from the unirradiated portion of the film have zero strength temperatures of 150±3° C. and are completely dissolved after five seconds in boiling dimethylformamide.

*Example 12*

An opaque white block of eu-polyoxymethylene, prepared by the polymerization of pure liquid formaldehyde at −80° C. in the presence of nitrogen as described by J. F. Walker, op. cit., page 145, is reduced to a fine powder by grinding. Ten parts of this powdered eu-polyoxymethylene is mixed in a ball mill with 1 part of 2,4-tolylenedimaleimide and 0.02 part of hydroquinone stabilizer. A 5-mil film of the resulting composition is molded at 190° C. and 5000 lb./sq. in. pressure in the manner of Example 1 and cut into strips ⅛″ x 2″. Six of these strips show zero strength temperatures ranging from 150 to 164° C. and are completely dissolved after one minute in boiling dimethylformamide. Five strips irradiated with 2 mev. electrons for two passes as in Example 1 show zero strength temperatures ranging from 179 to 197° C. and leave large residues of undissolved gel after two minutes in boiling dimethylformamide.

*Example 13*

Polyoxymethylene B fluff is intimately mixed in a ball mill with 6% by weight of N,N′-methylenediacrylamide. Portions of the mixture are molded into films five mils thick and ten mils thick by pressing between platens at 190° C. and 4000 lb./sq. in. pressure. Samples of each thickness of film are irradiated with 2 mev. electrons for two passes in the manner of Example 1.

The following test indicates that the polymer in the irradiated films is crosslinked. Two portions of the 10-mil irradiated film are boiled for 60 minutes and 120 minutes, respectively, in dimethylformamide. Both films are softened and swollen by this treatment but become stiff again when dried under vacuum. An unirradiated control portion of the film dissolves completely in dimethylformamide before it can be brought to a boil (less than five minutes).

A portion of the 5-mil irradiated film is found to have a zero strength temperature of 245° C. An unirradiated control film has a zero strength temperature of 154° C. In a test similar to the zero strength test described above but employing a slower heating cycle so that the temperature of the bar is raised from 25° C. to 233° C. over a period of 22 minutes, the free end of a strip of the 5-mil irradiated film breaks and falls away at 233° C.

*Example 14*

An intimate composition of polyoxymethylene B and 6% by weight of m-phenylenedimaleimide is prepared, molded into films, and irradiated in the same manner as in Example 13.

A portion of a 10-mil irradiated film of this composition is boiled for 60 minutes in dimethylformamide. The film becomes swollen and softened but does not dissolve. An unirradiated control dissolves in less than five minutes.

A portion of the 5-mil irradiated film is found to have a zero strength temperature of 218° C. An unirradiated control film has a zero strength temperature of 146° C. In a test similar to the zero strength test described above but employing a slower heating cycle so that the temperature of the bar is raised from 25° C. to 206° C. over a period of 17½ minutes, the free end of a strip of the 5-mil irradiated film breaks and falls away at 206° C.

*Example 15*

An intimate composition of polyoxymethylene B and 6% by weight of 2,4-tolylenedimaleimide is prepared, molded, and irradiated for two passes with 2 mev. electrons in the manner of Example 13.

A portion of a 10-mil film of this irradiated composition is boiled for 60 minutes in dimethylformamide. The film is swollen and softened but only partly dissolved by this treatment. An unirradiated control dissolves in less than five minutes.

A portion of the 5-mil irradiated film is found to have a zero strength temperature of 226° C. An unirradiated control film has a zero strength temperature of 149° C. In a test similar to the zeo strength test described above but employing a slower heating cycle so that the temperature of the bar is raised from 25° C. to 207° C. over a period of 19½ minutes, the free end of a strip of the 5-mil irradiated film breaks and falls away at 207° C.

*Example 16*

Polyoxymethylene A fluff is intimately mixed with 10% by weight of diallyl maleate by dissolving the maleate in an excess of ether, slurrying the polymer fluff in the resulting solution and evaporating the ether. Films are molded from this composition by pressing between platens at 190° C. and 4000 lb./sq. in. pressure. One film is irradiated in air with 2 mev. electrons for 5 passes in the manner of Example 1. The irradiated film has a zero strength temperature of 179° C. compared to 159° C. for an unirradiated control. The unirradiated film dissolves completely in boiling dimethylformamide in 30 seconds, whereas the irradiated film is swollen and distorted but not dissolved after one hour in boiling dimethylformamide.

*Example 17*

Polyoxymethylene B fluff is intimately mixed with 6% by weight of N-allylacrylamide by slurrying with ether, followed by evaporation of the ether in the manner of Example 16. Films are pressed in a similar manner. A film irradiated with 2 mev. electrons for 2 passes exhibits a zero strength temperature of 195° C. compared to 153° C. for an unirradiated control. The unirradiated film dissolves completely in boiling dimethylformamide within 30 seconds, whereas the irradiated sample is only slightly swollen after 5 minutes in boiling dimethylformamide.

*Example 18*

Polyoxymethylene B fluff is intimately mixed with 6% by weight of N,N-diallylacrylamide using the ether technique of Example 16 and films are pressed in the manner there described. A film irradiated with 2 mev. electrons for 2 passes has a zero strength temperature of 154° C. compared to 146° C. for an unirradiated control. The control film dissolves completely in boiling dimethylformamide within 30 seconds, whereas the irradiated film is swollen and distorted but not dissolved after 5 minutes in boiling dimethylformamide.

*Example 19*

This example illustrates the relative effectiveness of a number of crosslinking agents on the zero strength temperature and solubility of polyoxymethylene B.

Films of polyoxymethylene B having intimately dispersed therein the respective agents indicated in Table V are irradiated with 2 mev. electrons for one or two passes as indicated. One portion of each film is used to determine zero strength temperature. Another portion is carefully weighed and then boiled for 2.0 minutes in an excess of 100 times its weight of dimethylformamide. At the end of this time the residue of the film is retrieved, pressed dry between paper towels, thoroughly washed in hot acetone, pressed dry again between paper towels and finally dried under vacuum at 50° C. to remove last traces of dimethylformamide and acetone. The film is then carefully weighed.

As noted respectively in Examples 18, 15, 14 and 13 above, control unirradiated samples of compositions similar to A, B, C and D have zero strength temperatures of 146°, 149°, 146°, and 154° C. respectively. All these controls are completely dissolved after 2 minutes in boiling dimethylformamide.

*Example 20*

A fluff sample of polyoxymethylene B is intimately mixed in a ball mill with 5% by weight of N,N'-methylenediacrylamide and 1% by weight of benzoin methyl ether. Portions of this mixture are converted to films five mils thick by pressing between platens at 190° C. and 4000 lb./sq. in. pressure and then cooling. The films have zero strength temperatures of 150±2° C. as determined by the test shown above. Portions of the films are irradiated with ultraviolet light at a distance of ½″ from two 15-watt General Electric Company Black Light fluorescent bulbs for periods of 1, 3, and 22 hours. Each of these bulbs emits a total of 2.5 watts of radiation below 7000 A. in wave length, of which about 0.09 watt is ultraviolet light in the range of 2800 to 3200 A. and about 2.1 watts is ultraviolet light of wave length from 3200 to 3800 A. The irradiated films exhibit zero strength temperatures of 193° C., 209° C., and 213° C., respectively, indicating that the compositions have become crosslinked. Control films of polyoxymethylene B containing 5% N,N-methylenediacrylamide, but no benzoin methyl ether, show no change in zero strength temperature after 20 hours of irradiation with ultraviolet light under the same conditions.

*Examples 21–23*

Films of compositions prepared from polyoxymethylene B and the indicated crosslinking agents and photoinitiators are prepared in the manner of Example 20. Portions of the films are irradiated under the conditions of Example 20 for periods of one-half hour and one hour, respectively. Zero strength temperatures of these compositions are shown in the following table:

| Example | Crosslinking Agent | Photo-initiator | Zero Strength Temperature, °C. | | |
|---|---|---|---|---|---|
| | | | No Irradiation | ½ Hour Irradiation | 1 Hour Irradiation |
| 21 | 5% N,N'-methylenediacrylamide. | 1% anthraquinone | 163 | 193 | 198 |
| 22 | 5% m-phenylenedimaleimide | 1% anthraquinone | 150 | 155 | 171 |
| 23 | 5% m-phenylenedimaleimide | 1% benzoin methyl ether | 164 | 195 | 209 |

Prior to irradiation with ultraviolet light the film compositions of Examples 21, 22, and 23 dissolve in boiling dimethylformamide within five to ten seconds. The irradiated compositions swell in boiling dimethylformamide but after two minutes are only partly dissolved.

TABLE V

| Sample | Crosslinking Agent | Film Thickness (mils) | Irradiation (passes) | Zero Strength Temp. (°C.) | Percent of Original Wt. Retained After 2 Minutes in Boiling Dimethylformamide |
|---|---|---|---|---|---|
| A | 6% N,N-diallyl-acrylamide | 7.5 | 2 | 174 | 38.6 |
| B | 6% 2,4-tolylene-dimaleimide. | 6.0 | 1 | 202 | 33.6 |
| C | 6% m-phenylenedimaleimide. | 7.5 | 1 | 203 | 43.3 |
| D | 6% methylene-diacrylamide. | 7.5 | 1 | 242 | 49.1 |

Example 24

Five-mil films of polyoxymethylene B containing 5% N,N'-methylenediacrylamide and 1% anthraquinone are prepared in the manner of Example 21. A sample of this film is drawn to four times its original length at 145° C. The drawn film has a zero strength temperature of 163° C. and dissolves within a few seconds in boiling dimethylformamide. A strip of this drawn film is irradiated with ultraviolet light for one hour in the manner described in Example 20. The resulting film has a zero strength temperature of 189° C. and swells, but does not dissolve, after two minutes in boiling dimethylformamide. An undrawn portion of the starting film is first irradiated with ultraviolet light in the manner noted above for one-half hour. It is then drawn to four times its initial length at 145° C., and irradiated with ultraviolet light for another half hour. The resulting film has a zero strength temperature of 206° C. and is insoluble after two minutes in boiling dimethylformamide.

Since obvious modifications of the invention will be evident to those skilled in the art, I propose to be bound solely by the appended claims.

I claim:

1. The process of crosslinking linear polyoxymethylene, which comprises irradiating with ultraviolet light of a wave length within the range of 500 to 4000 A. a mixture of a polyoxymethylene having a chain of at least 100 formaldehyde units in length, about 0.5–20% by weight of a functional derivative of a carboxylic acid selected from the group consisting of esters, amides and imides containing at least two carbon-to-carbon unsaturated linkages, said weight being based on the weight of the polyoxymethylene, and a photoinitiator, and thereby crosslinking the polyoxymethylene.

2. The process of crosslinking linear polyoxymethylene, which comprises irradiating with ultraviolet light of a wave length within the range of 500 to 4000 A. a mixture of a polyoxymethylene having a chain of at least 100 formaldehyde units in length, about 0.5–20% by weight of N,N'-methylenediacrylamide, and 0.5–5% by weight of benzoin methyl ether, all weights being based on the weight of the polyoxymethylene, and thereby crosslinking the polyoxymethylene.

3. The process of crosslinking linear polyoxymethylene, which comprises irradiating with ultraviolet light of a wave length within the range of 500 to 4000 A. a mixture of a polyoxymethylene having a chain of at least 100 formaldehyde units in length, about 0.5–20% by weight of N,N'-methylenediacrylamide, and 0.5–5% by weight of anthraquinone, all weights being based on the weight of the polyoxymethylene, and thereby crosslinking the polyoxymethylene.

4. The process of crosslinking linear polyoxymethylene which comprises irradiating with ultraviolet light of a wave length within the range of 500 to 4000 A. a mixture of a polyoxymethylene having a chain of at least 100 formaldehyde units in length, about 0.5–20% by weight of m-phenylenedimaleimide, and 0.5–5% by weight of anthraquinone, all weights being based on the weight of the polyoxymethylene, and thereby crosslinking the polyoxymethylene.

5. The process of crosslinking linear polyoxymethylene which comprises irradiating with ultraviolet light of a wave length within the range of 500 to 4000 A. a mixture of a polyoxymethylene having a chain of at least 100 formaldehyde units in length, about 0.5–20% by weight of m-phenylenedimaleimide, and 0.5–5% by weight of benzoin methyl ether, all weights being based on the weight of the polyoxymethylene, and thereby crosslinking the polyoxymethylene.

6. In a process for improving the physical properties of linear polyoxymethylene by crosslinking the same, the step comprising subjecting to at least about 25,000 rads of ionizing radiation having a minimum energy of 100 electron volts an intimate mixture of polyoxymethylene having a chain at least 100 oxymethylene units in length with about 0.5–20% by weight of a functional derivative of a carboxylic acid selected from the class consisting of esters, amides and imides containing at least two nonadjacent ethylenic ($>C=C<$) groups, said ethylenic groups being selected from the class consisting of terminal ethylenic groups and nonterminal ethylenic groups conjugated with oxo oxygen supplied by a member of the class consisting of ester, amide and imide groups.

7. The process of claim 6 wherein the irradiation is continued until the resultant polyoxymethylene is such that at least 30% remains undissolved when a film thereof of 5–8 mil thickness is immersed in 100 times its weight of boiling dimethylformamide for 2 minutes.

8. The process of crosslinking linear polyoxymethylene which comprises subjecting to at least about 25,000 rads of ionizing radiation having a minimum energy of 100 electron volts an intimate mixture of a polyoxymethylene dicarboxylate wherein the polyoxymethylene consists of chains at least 100 oxymethylene units in length with about 0.5–20% by weight of a functional derivative of a carboxylic acid selected from the class consisting of esters, amides and imides containing at least two nonadjacent ethylenic ($>C=C<$) groups, said ethylenic groups being selected from the class consisting of terminal ethylenic groups and nonterminal ethylenic groups conjugated with oxo oxygen supplied by a member of the class consisting of ester, amide and imide groups.

9. The process of claim 8 wherein the dicarboxylate is a diacetate.

10. The process of claim 9 wherein the functional derivative of a carboxylic acid is N,N'-methylenediacrylamide.

11. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from reaction of the chains with a functional derivative of a carboxylic acid selected from the class consisting of esters, amides and imides containing at least two nonadjacent ethylenic ($>C=C<$) groups, said ethylenic groups being selected from the class consisting of terminal ethylenic and nonterminal ethylenic groups conjugated with oxo oxygen supplied by a member of the class consisting of ester, amide and imide groups, said crosslinked polymer being such that at least 30% remains undissolved when a film thereof 5–8 mils in thickness is immersed in 100 times its weight of boiling dimethylformamide for 2 minutes.

12. The crosslinked polymer of claim 11 in the form of a filament.

13. The crosslinked polymer of claim 11 in the form of a fiber.

14. A fabric containing the fiber of claim 13.

15. The crosslinked polymer of claim 11 in the form of a film.

16. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with N,N'-methylenediacrylamide, said crosslinked polymer being such that at least 30% remains undissolved when a film thereof 5–8 mils in thickness is immersed in 100 times its weight of boiling dimethylformamide for 2 minutes.

17. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with m-phenylenedimaleimide, said crosslinked polymer being such that at least 30% remains undissolved when a film thereof 5–8 mils in thickness is immersed in 100 times its weight of boiling dimethylformamide for 2 minutes.

18. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with triethylene glycol dimethacrylate, said crosslinked polymer being such that at least 30% remains undissolved when a film thereof 5–8 mils in thickness is immersed in 100 times its weight of boiling dimethylformamide for 2 minutes.

19. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with diallyl maleate, said crosslinked polymer being such that at least 30% remains undissolved when a film thereof 5–8 mils in thickness is immersed in 100 times its weight of boiling dimethylformamide for 2 minutes.

20. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with triallyl cyanurate, said crosslinked polymer being such that at least 30% remains undissolved when a film thereof 5–8 mils in thickness is immersed in 100 times its weight of boiling dimethylformamide for 2 minutes.

21. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with 2,4-tolylenedimaleimide, said crosslinked polymer being such that at least 30% remains undissolved when a film thereof 5–8 mils in thickness is immersed in 100 times its weight of boiling dimethylformamide for 2 minutes.

22. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with N-allylacrylamide, said crosslinked polymer being such that at least 30% remains undissolved when a film thereof 5–8 mils in thickness is immersed in 100 times its weight of boiling dimethylformamide for 2 minutes.

23. The crosslinked polymer consisting essentially of linear polyoxymethylene chains at least 100 oxymethylene units in length bridged together by about 0.5–20% by weight, based on the weight of polyoxymethylene, of divalent radicals —Q— resulting from the reaction of the chains with N,N-diallylacrylamide, said crosslinked polymer being such that at least 30% remains undissolved when a film thereof 5–8 mils in thickness is immersed in 100 times its weight of boiling dimethylformamide for 2 minutes.

24. The crosslinked polymer of claim 11 wherein the linear polyoxymethylene chains are terminated by carboxylate groups.

25. The crosslinked polymer of claim 24 wherein the functional derivative of a carboxylic acid is N,N′-methylene-diacrylamide.

References Cited by the Examiner
UNITED STATES PATENTS

| | | | |
|---|---|---|---|
| 2,296,249 | 9/42 | Austin et al. | 260—67 |
| 2,768,994 | 10/56 | MacDonald | 260—67 |
| 2,810,708 | 10/57 | Kubico et al. | 260—67 |
| 2,828,287 | 3/58 | Cairns et al. | 260—67 |
| 2,844,561 | 7/58 | Bechtold et al. | 260—901 |
| 2,863,812 | 12/58 | Graham | 204—154 |
| 2,926,126 | 2/60 | Graham et al. | 204—158 |
| 2,998,409 | 8/61 | Nogare et al. | 260—67 |

WILLIAM H. SHORT, *Primary Examiner.*

J. R. SPECK, HAROLD N. BURSTEIN, JOSEPH R. LIBERMAN, *Examiners.*